United States Patent [19]

Aken et al.

[11] Patent Number: 5,399,051
[45] Date of Patent: Mar. 21, 1995

[54] INTERCHANGEABLE HEAD BORING OR DRIVING APPARATUS

[76] Inventors: Douglas G. Aken; Renee J. Aken, both of 2623 N. 125th Cir., Omaha, Nebr. 68164

[21] Appl. No.: 100,255

[22] Filed: Aug. 2, 1993

[51] Int. Cl.$^6$ .............................................. B23B 51/00
[52] U.S. Cl. ....................................... 408/233; 7/165; 279/83; 408/226; 408/230
[58] Field of Search ............... 408/117, 118, 199, 200, 408/201, 225, 226, 230, 231, 232, 233, 239 A, 713, 241 R; 279/14, 83, 86; 7/158, 165

[56] References Cited

U.S. PATENT DOCUMENTS

| | | | |
|---|---|---|---|
| 256,078 | 4/1882 | Titus | 279/83 |
| 857,151 | 6/1907 | Booth | 279/83 |
| 932,071 | 8/1909 | Urbscheit | 408/233 |
| 1,048,035 | 12/1912 | Campbell | 408/231 |
| 1,697,414 | 1/1929 | Cordray | 7/165 |
| 2,073,430 | 3/1937 | Tautz | 279/83 |
| 3,023,015 | 2/1962 | Pankow | 7/165 |
| 3,994,615 | 11/1976 | Narang | 408/233 |

FOREIGN PATENT DOCUMENTS

560257 7/1958 Canada .................... 7/165

*Primary Examiner*—Daniel W. Howell

[57] ABSTRACT

A new and improved interchangeable head boring or driving apparatus includes a first head-receiving member which includes a first polygonal-shaped receiving well which is in alignment with a longitudinal axis of the head-receiving member. A plurality of respective interchangeable head assemblies include respective head elements and respective projections which project from the head elements. The respective projections include a first polygonal shape complementary to the first polygonal-shaped receiving well. The respective projections project from the head elements, such that, when the respective projections are inserted into the first polygonal-shaped receiving well, the respective projections and the first polygonal-shaped receiving well arc coaxial along the longitudinal axis. A locking assembly locks the respective projections into the first polygonal-shaped receiving well of the head-receiving member. The first polygonal-shaped projection and the first polygonal-shaped receiving well may have respective cross-sectional shapes of a quadrilateral, a triangle, a hexagon, or a semicircle, among others. The interchangeable head assembly may include a screwdriver blade portion. The screwdriver blade portion is connected to a projection. A flexible belt retainer assembly is provided for a plurality of interchangeable head assemblies and includes a flexible belt member, complementary belt connecting straps attached to the flexible belt member, a plurality of receivers for receiving the head-receiving members, and a plurality of receivers for receiving the interchangeable head assemblies, whether they be for interchangeable drill bits or for interchangeable screwdriver blades.

16 Claims, 4 Drawing Sheets

INTERCHANGEABLE HEAD BORING OR DRIVING APPARATUS

BACKGROUND OF THE INVENTION

1. Field of the Invention

The present invention relates generally to drilling devices and screwdriver devices and more particularly, to drill bits and screwdriver blades.

2. Description of the Prior Art

Drilling devices are well known in the art. Commonly, drilling devices are powered by electric motors. Alternatively, drilling devices are manually powered. Generally, a drilling device includes two main components: a driving device and a driven device. The driving device generally includes some kind of chuck for securing the driven device. The driven device is most often referred to as a drill bit.

The drill bit generally has a number of distinct portions. There is a tang portion that fits into the chuck. A shank portion extends away from the tang portion to a twist portion. At the far end of the twist portion, the head portion is located. For a drill, the head portion generally includes a cutting element.

Often a power screwdriver will include a bit that is very similar to a drill bit. That is, a driven member includes a tank portion and a shank portion. The head portion, instead of having a cutting element, will have a screwdriver blade.

Throughout the years, a number of innovations have been developed relating to drill bits. The following U.S. patents are representative of some of those innovations: 3,589,826; 4,992,009; 5,024,566; 5,049,010; and 5,061,127.

More specifically, U.S. Pat. Nos. 3,589,826, 4,992,009, and 5,061,127 disclose drill bits having variations in the cutting head. In each of these devices, the cutting head, the twist portion, the shank, and the tang are a unified, integrated structure. This means that when the cutting head wears down or gets dull, the entire drill bit, including the twist portion, the shank, and the tang must be disposed of and replaced along with the worn cutting head. This is wasteful for a number of reasons. It is wasteful of metal because the twist portion, the shank, and the tang must be replaced even if they are perfectly fine. It is wasteful of money because perfectly fine used components must be discarded, and new components must be paid for along with the new cutting head. In this respect, it would be desirable if a drill bit device were provided which did not necessitate replacement of a twist portion, a shank portion, and a tang portion when the head portion was replaced.

U.S. Pat. No. 5,024,566 discloses a compound drill bit that contains two individual interchangeable drill bit heads retained in a common housing. Each drill bit head has an associated handle and slot for guiding the respective handle and drill bit head into and out of drilling position. The structural support for each drill bit head with the common housing is relatively flimsy because of the complexities of the selection structures for selecting the desired drill bit head. Moreover, only two selectable drill bit heads are disclosed. The limited number of interchangeable drill bit heads is limited by a number of factors: the complexities of the interior structures of the drill bit head housing; obtaining rotary dynamic balance for the complex drill bit housing and the multiple drill bit heads contained therein. In this respect, it would be desirable if a drill bit device provided the benefits of interchangeable drill bit heads without employing a complex housing that contains a plurality of interchangeable drill bit heads that is difficult to manufacture and to dynamically balance.

U.S. Pat. No. 5,049,010 discloses a metal cutting tool that includes two cutting members, a relatively large diameter, cylindrical cutting member and a relatively small diameter cylindrical pilot bit that is centrally located with respect to the large diameter cylindrical cutting member. The cylindrical pilot bit is relatively short and has two equal but opposite cutting ends separated from one another by a cylindrical shank which includes a planar notch that receives a set screw for locking the cylindrical pilot bit in position inside the large diameter cylindrical cutting member. In this device, the engagement between the set screw and the planar notch absorbs large torsional forces between the cylindrical drill bit and the large diameter cylindrical cutting member and prevents the cylindrical drill bit from rotating independently of the large diameter cylindrical cutting member. Moreover, the engagement between the set screw and the planar notch prevents the cylindrical pilot bit from moving longitudinally with respect to the large diameter cutting member. In other words substantially all the stresses (both torque and longitudinal stresses) that exist between the large diameter cylindrical cutting member and the small diameter cylindrical pilot bit are absorbed by the engagement of the set screw with the planar notch. The surface area of engagement of the set screw with the planar notch is very small. In this respect, the absorption of large torsional stresses on such a small area of engagement causes a large amount of wear, tear, and fatigue on the small area of engagement. In this respect, it would be desirable if a drill bit device were provided which provided a relatively large surface area of engagement between a replaceable drill bit head and its supporting structure so that torsional stresses between the replaceable drill bit head and its supporting structure is distributed over a relatively large surface area.

The discussion above relating to torsional stresses for drill bits also apply to screwdriver blades. Similarly, then, it would be desirable if a screwdriver blade device were provided which provided a relatively large surface area of engagement between a replaceable screwdriver blade head and its supporting structure so that torsional stresses between the replaceable screwdriver blade head and its supporting structure is distributed over a relatively large surface area.

Numerous types of drill bits are manufactured to cut numerous types of materials. To an expert, the shape of the cutting head may indicate the type of material that the drill bit is designed to cut. However, many people do not have the knowledge that would permit them to determine the kinds of material that can be drilled by a visual inspection of the cutting head of the drill bit. In this respect, it would be desirable if a drill bit device were provided which had some kind of instructive indicia which indicated to the user which type of materials the drill bit is designed to cut.

Moreover, drill bits vary as to the type of material from which they are fabricated. Some drill bits are made of expensive, very hard metals. Other drill bits are made of more inexpensive softer metals. If a drill bit made of a relatively soft metal is used to bore into a very hard metal stock, the soft-metal drill bit will become dulled very prematurely. Often one is not able to assess the durability of a drill bit simply by visually inspecting the shape of the cutting head. A hard metal drill bit and a soft metal drill bit may have the same shaped cutting head. In this respect, it would be desirable if a drill bit device were provided that had some kind of instructive indicia which indicated to the user which type of material the drill bit is fabricated from.

As mentioned above, drill bits and screwdrivers have much in common. For example, to be used with a powered driver, they both have a tang, a shaft, and a head portion. In this respect, it would be desirable if a drill bit device were provided which had common tang and shaft portions and which had interchangeable heads that could be interchanged between cutting heads for a drill and blade-containing heads for a screwdriver.

Moreover, screwdriver blades vary as to the type of material from which they are fabricated. Some screwdriver blades are made of expensive, very hard metals. Other screwdriver blades are made of more inexpensive softer metals. If a screwdriver blade made of a relatively soft metal is used on a screw that is torqued tightly, the soft-metal screwdriver blade may become dulled very prematurely. Often one is not able to assess the durability of a screwdriver blade simply by visually inspecting the screwdriver blade. A hard metal screwdriver blade and a soft metal screwdriver blade may both look very much alike. In this respect, it would be desirable if a screwdriver blade device were provided that had some kind of instructive indicia which indicated to the user which type of material the screwdriver blade was fabricated from.

Often a worker would like to carry a large number of drill bits and screwdriver blades to a job site to have versatility in selection of respective drill bits and screwdriver blades. Sets of drill bits and screwdriver blades are often stored and carried in portable containers that are hand carried to the job site. For purposes of convenience and to free a worker's hands for other tasks, it would be desirable if a set of drill bits or screwdriver blades could be carried by a worker in belt device.

Often, sets of drill bits and screwdriver blades are carried in containers that include a plurality of receiver portions for receiving respective drill bits and screwdriver blades. However, contact between respective receiver portions and the respective drill bits and screwdriver blades if often very insecure. As a result, individual drill bits and screwdriver blades often separate from their respective receiver portions, and often a confusing, messed up array of drill bits and screwdriver blades results. In this respect, it would be desirable if a drill bit device were provided which included receiver portions for drill bits and screwdriver blades that included means for retaining the respective items in their respective receiver portions.

Thus, while the foregoing body of prior art indicates it to be well known to use a variety of types of drill bits and a variety of types of screwdriver blades, the prior art described above does not teach or suggest an interchangeable head boring or driving apparatus which has the following combination of desirable features: (1) does not necessitate replacement of a twist portion, a shank portion, and a tang portion when the head portion is replaced; (2) provides the benefits of interchangeable drill bit heads without employing a complex housing that contains a plurality of interchangeable drill bit heads that is difficult to manufacture and to dynamically balance; (3) provides a relatively large surface area of engagement between a replaceable drill bit head and its supporting structure so that torsional stresses between the replaceable drill bit head and its supporting structure is distributed over a relatively large surface area; (4) has some kind of instructive indicia which indicates to the user which type of materials the drill bit is designed to cut; (5) has some kind of instructive indicia which indicates to the user which type of material the drill bit is fabricated from; (6) has common tang and shaft portions and which has interchangeable heads that can be interchanged between cutting heads for a drill and blade-containing heads for a screwdriver; (7) has a screw driver blade device has some kind of instructive indicia which indicates to the user which type of material the screw driver blade is fabricated from; (8) can carry a set of drill bits or screwdriver blades in a belt device; (9) includes receiver portions for drill bits and screwdriver blades that includes means for retaining the respective items in their respective receiver portions; and (10) provides a relatively large surface area of engagement between a replaceable screwdriver blade head and its supporting structure so that torsional stresses between the replaceable screwdriver blade head and its supporting structure is distributed over a relatively large surface area. The foregoing desired characteristics are provided by the unique interchangeable head boring or driving apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved interchangeable head boring or driving apparatus which includes a first head-receiving member which includes a first polygonal-shaped receiving well which is in alignment with a longitudinal axis of the head-receiving member. A plurality of respective interchangeable head assemblies include respective head elements and respective projections which project from the head elements. The respective projections include a first polygonal shape complementary to the first polygonal-shaped receiving well. The respective projections project from the head elements, such that, when the respective projections are inserted into the first polygonal-shaped receiving well, the respective projections and the first polygonal-shaped receiving well are coaxial along the longitudinal axis. A locking assembly locks the respective projections into the first polygonal-shaped receiving well of the head-receiving member.

The first polygonal-shaped projection and the first polygonal-shaped receiving well may have respective cross-sectional shapes of a quadrilateral, a triangle, a hexagon, or a semicircle, among others.

The head-receiving member includes a shank portion and may include a twist portion, and the respective interchangeable head assemblies include respective head elements which include respective cutting edges.

The interchangeable head assembly may include a screwdriver blade portion. The screwdriver blade portion is connected to a projection. The screwdriver blade portion may be connected to the projection through an intermediate hemispherical member. The intermediate hemispherical member includes a receiving well for receiving one end of the screwdriver blade portion. The end of the screwdriver blade portion includes a channel, which receives a locking pin that is inserted in another channel in the intermediate hemispherical member.

In addition, for the screwdriver blade embodiment of the invention, the projection is placed in a head-receiving member which includes its first polygonal-shaped receiving well. The head-receiving member includes its own channel for receiving its own locking pin that is inserted through channel which is placed in registration with channel in the projection. The head-receiving member includes a polygonal-shaped protuberance that fits into a complementary polygonal-shaped recess formed in respective portions of bottom sides of the respective interchangeable head assemblies.

A flexible belt retainer assembly is provided for a plurality of interchangeable head assemblies. The flexible belt retainer assembly includes a flexible belt member, complementary belt connecting straps attached to the flexible belt member, a plurality of receivers for receiving the head-receiving members, and a plurality of receivers for receiving the interchangeable head assemblies, whether they be for interchangeable drill bits or for interchangeable screwdriver blades. A receptacle for an interchangeable head assembly includes a retention spring or a magnet for retaining the interchangeable head assembly in the receptacle.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved interchangeable head boring or driving apparatus which has all of the advantages of the prior art and none of the disadvantages.

It is another object of the present invention to provide a new and improved interchangeable head boring or driving apparatus which may be easily and efficiently manufactured and marketed.

It is a further object of the present invention to provide a new and improved interchangeable head boring or driving apparatus which is of durable and reliable construction.

An even further object of the present invention is to provide a new and improved interchangeable head boring or driving apparatus which is susceptible of a low cost of manufacture with regard to both materials and labor, and which accordingly is then susceptible of low prices of sale to the consuming public, thereby making such interchangeable head boring or driving apparatus available to the buying public.

Still yet a further object of the present invention is to provide a new and improved interchangeable head boring or driving apparatus which does not necessitate replacement of a twist portion, a shank portion, and a tang portion when the head portion is replaced.

Still another object of the present invention is to provide a new and improved interchangeable head boring or driving apparatus that provides the benefits of interchangeable drill bit heads without employing a complex housing that contains a plurality of interchangeable drill bit heads that is difficult to manufacture and to dynamically balance.

Yet another object of the present invention is to provide a new and improved interchangeable head boring or driving apparatus which provides a relatively large surface area of engagement between a replaceable drill bit head and its supporting structure so that torsional stresses between the replaceable drill bit head and its supporting structure is distributed over a relatively large surface area.

Even another object of the present invention is to provide a new and improved interchangeable head boring or driving apparatus that has some kind of instructive indicia which indicates to the user which type of materials the drill bit is designed to cut.

Still a further object of the present invention is to provide a new and improved interchangeable head boring or driving apparatus which has some kind of instructive indicia which indicates to the user which type of material the drill bit is fabricated from.

Yet another object of the present invention is to provide a new and improved interchangeable head boring or driving apparatus that has common tang and shaft portions and which has interchangeable heads that can be interchanged between cutting heads for a drill and blade-containing heads for a screwdriver.

Still another object of the present invention is to provide a new and improved interchangeable head boring or driving apparatus which has a screw driver blade device has some kind of instructive indicia which indicates to the user which type of material the screw driver blade is fabricated from.

Yet another object of the present invention is to provide a new and improved interchangeable head boring or driving apparatus that can carry a set of drill bits or screwdriver blades in a belt device.

Still a further object of the present invention is to provide a new and improved interchangeable head boring or driving apparatus that includes receiver portions for drill bits and screwdriver blades that includes means for retaining the respective items in their respective receiver portions.

Yet another object of the present invention is to provide a new and improved interchangeable head boring or driving apparatus which provides a relatively large surface area of engagement between a replaceable screwdriver blade head and its supporting structure so that torsional stresses between the replaceable screwdriver blade head and its supporting structure is distributed over a relatively large surface area.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved interchangeable head boring or driving apparatus embodying the principles and concepts of the present invention will be described.

Figure 1:
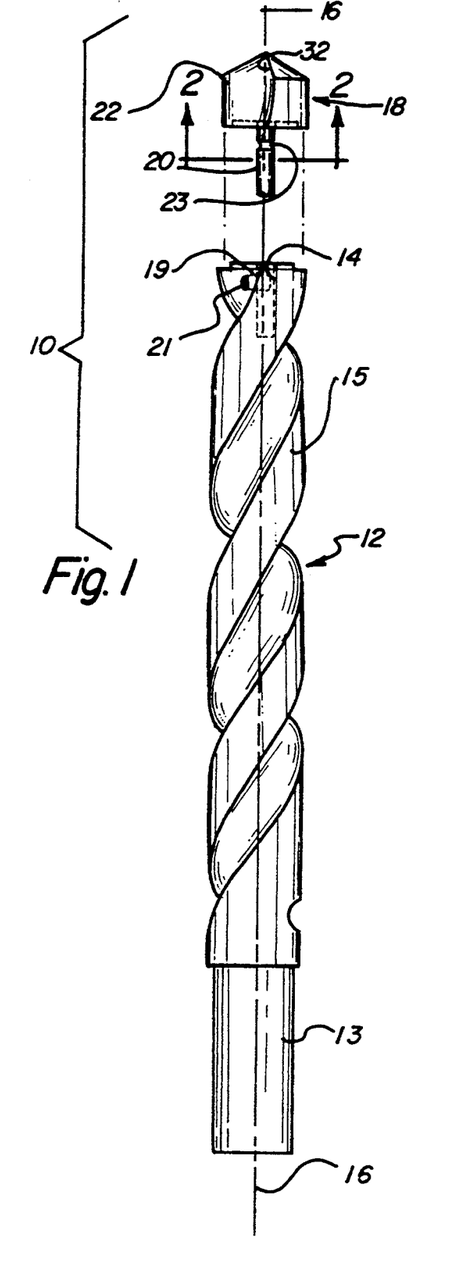
FIG. 1 is a perspective view showing a first preferred embodiment of the interchangeable head boring or driving apparatus of the invention using interchangeable drill bits.
Figure 2:
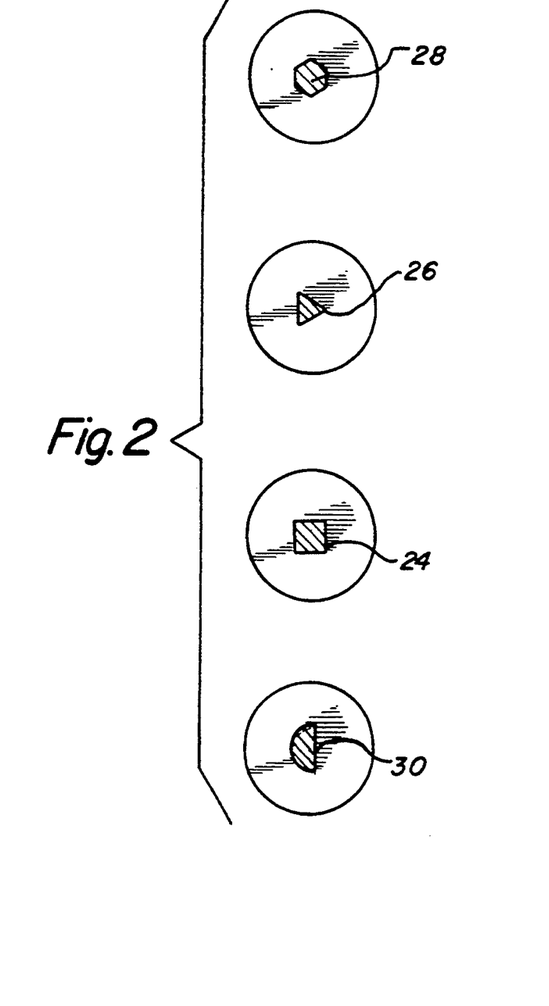
FIG. 2 is an array of alternative cross-sectional views of an interchangeable head drill bit shown in FIG. 1 taken along line 2—2 of FIG. 1.

Turning initially to FIGS. 1-2, there is shown a first exemplary embodiment of the interchangeable head boring or driving apparatus of the invention generally designated by reference numeral 10 and employed for interchangeable drill bit heads. In its preferred form, interchangeable head boring or driving apparatus 10 includes a first head-receiving member 12 which includes a first polygonal-shaped receiving well 14 which is in alignment with a longitudinal axis 16 of the head-receiving member 12. A plurality of respective interchangeable head assemblies 18 include respective head elements 22 and respective projections 20 which project from the head elements 22. The respective projections 20 include a first polygonal shape complementary to the first polygonal-shaped receiving well 14. The respective projections 20 project from the head elements 22, such that, when the respective projections 20 are inserted into the first polygonal-shaped receiving well 14, the respective projections 20 and the first polygonal-shaped receiving well 14 are coaxial along the longitudinal axis 16. A locking assembly locks the respective projections 20 into the first polygonal-shaped receiving well 14 of the head-receiving member 12.

The straight sides of the polygonal-shaped receiving well 14 and the projections 20 provide a large surface area for absorbing torsional forces between the interchangeable head assembly 18 and the head-receiving member 12.

The locking assembly includes a threaded channel 19 and a complimentarily threaded set screw 21. The channel 19 extends from the outer surface of the head-receiving member 12 to the first polygonal-shaped receiving well 14. When screwed in to lock against a projection 20, the set screw 21 may engage a flat side of the polygonal-shaped projection 20. Alternatively, the projection 20 may include a groove 23, and the set screw 21 may engage the groove 23.

The interengagement between the relatively large surface area polygonal-shaped projections 20 and relatively large surface area first polygonal-shaped receiving well 14 prevents relative motion between the projections 20 and the first polygonal-shaped receiving well 14 around the longitudinal axis 16. The contact of the set screw 21 with the projection 20 prevents relative motion between the projection 20 and the receiving well 14 along the longitudinal axis 16.

With the invention, when a particular interchangeable head assembly 18 becomes worn, it can readily be removed and replaced without replacing the head-receiving member 12 which can be used over and over, perhaps indefinitely, wherein Referring to FIG. 2, a number of different embodiments of polygonal-shaped projections 20 of the invention are shown. The first polygonal-shaped projection 20 and the first polygonal-shaped receiving well 14 may have respective cross-sectional shapes of a quadrilateral 24, a triangle 26, a hexagon 28, or a semicircle 30, among others.

In FIG. 1, the head-receiving member 12 includes a shank portion 13 and a twist portion 15, and the respective interchangeable head assemblies 18 include respective head elements 22 which include respective cutting edges 32. The combination of the head-receiving member 12 (which includes a shank portion 13 and a twist portion 15 and possibly a tang portion (not shown)) and the respective head element 22 which includes respective cutting edges 32 constitutes an interchangeable head drill bit apparatus.

Different classes of drill bit heads can have different polygonal-shaped projections 20 and complementary shaped wells 14. For example, drill bit heads for drilling into wood can employ respective quadrilateral shapes. Alternatively, drill bit heads for drilling into metal can employ respective triangular shapes. Drill bit heads for concrete can use still another polygonal shape. Still another variation in employing the invention can have screwdriver blade heads that are made of very hard metal to employ hexagonal shapes, and screwdriver blade heads that are made of softer metal can employ semicircular shapes. In effect, the differences in the shapes of the polygonal shapes serve as indicia for indicating various classes of interchangeable head assemblies 18.

Figure 3:
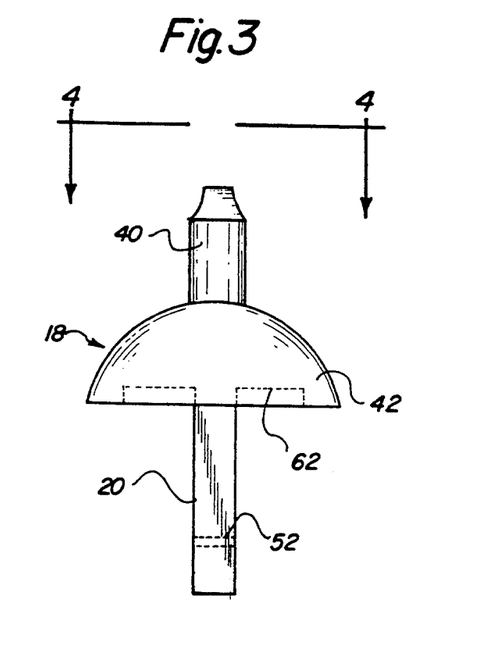
FIG. 3 is a side view of a second embodiment of the interchangeable head boring or driving apparatus of the invention which includes an interchangeable screwdriver blade.
Figure 4:
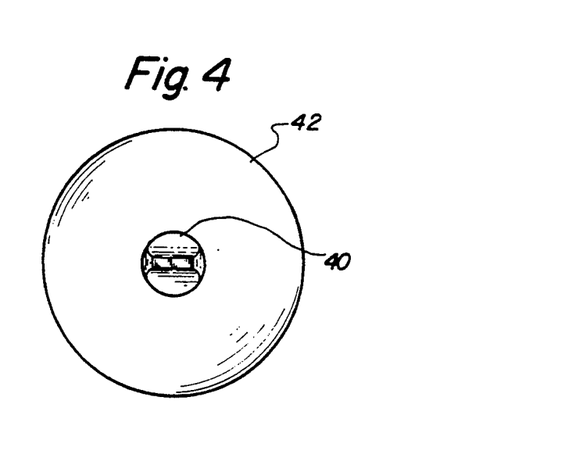
FIG. 4 is a top view of a the embodiment of the invention shown in FIG. 8 taken along the line 4—4 thereof.
Figure 5:
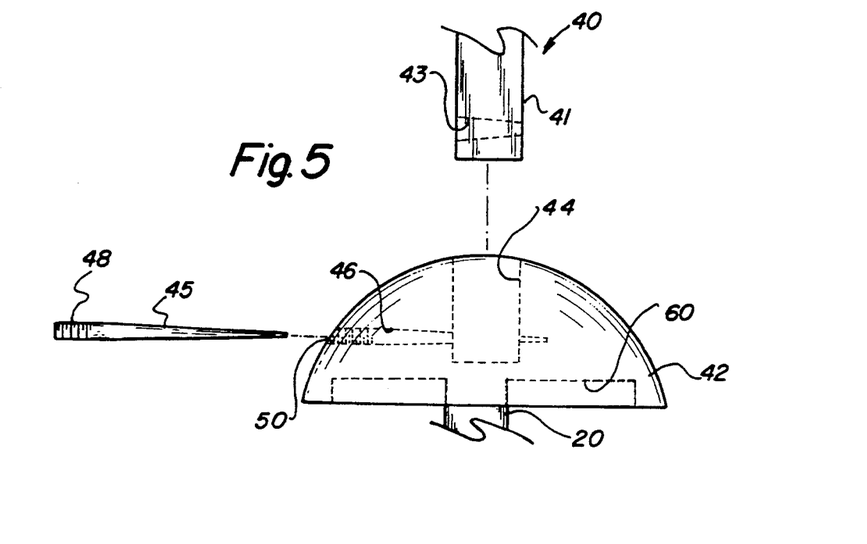
FIG. 5 is a partially exploded view of the embodiment of the invention shown in FIG. 3.

As shown in FIGS. 3–5, interchangeable head assembly 18 includes a screwdriver blade portion 40. The screwdriver blade portion 40 is connected to a projection 20 for connection to a complementary head-receiving member 12. More specifically, the screwdriver blade portion 40 is connected to the projection 20 through an intermediate hemispherical member 42. The intermediate hemispherical member 42 is optional. If desired, the screwdriver blade portion 40 can be connected directly to the projection 20. The intermediate hemispherical member 42 includes a receiving well 44 for receiving one end 41 of the screwdriver blade portion 40.

As shown in FIG. 5, the end 41 of the screwdriver blade portion 40 includes a channel 43 which receives a locking pin 45 that is inserted in a channel 46 in the intermediate hemispherical member 42. When the channel 43 in the end 41 of the screwdriver blade portion 40 is in registration with the channel 46 in the intermediate hemispherical member 42, then the locking pin 45 is inserted through the respective registered channels to lock the screwdriver blade portion 40 into the intermediate hemispherical member 42. The end of the locking pin 45 has threads 48 to engage complementary threads 50 in the intermediate hemispherical member 42 for securing the locking pin 45 to the intermediate hemispherical member 42. The channel 43, the well 44, the channel 46, and the locking pin 45 are optional. If desired, the screwdriver blade portion 40 can be permanently attached to the intermediate hemispherical member 42.

Figure 6:
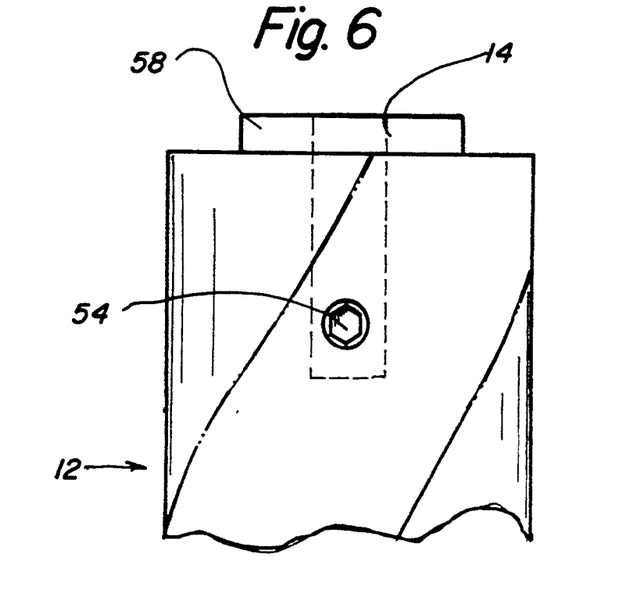
FIG. 6 is a side view of a shank of the invention adapted to retain the interchangeable screwdriver blade shown in FIG. 3.
Figure 7:
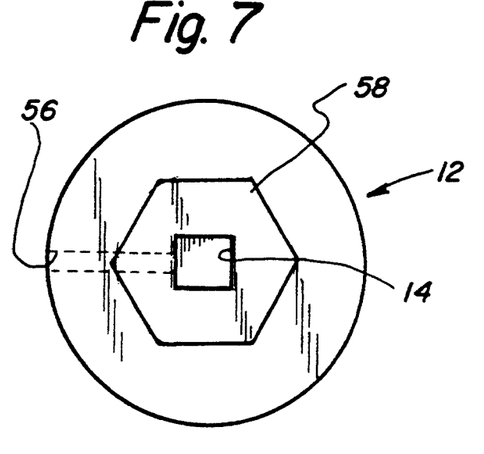
FIG. 7 is a top view of the shank of the invention shown in FIG. 6.

In addition, for the screwdriver blade embodiment of the invention, the projection 20 is placed in head-receiving member 12 which includes its first polygonal-shaped receiving well 14. The head-receiving member 12 includes its own channel 56 for receiving its own locking pin 54 (see FIGS. 6 and 7) that is inserted through channel 56 which is placed in registration with channel 52 in the projection 20. The head-receiving member 12 includes a polygonal-shaped protuberance 58 that fits into a complementary polygonal-shaped recess 60 formed in respective portions of bottom sides of the respective interchangeable head assemblies 18. The respective protuberances 58 and recesses 60 can be used for either drill bit heads or screwdriver blade heads.

Figure 8:
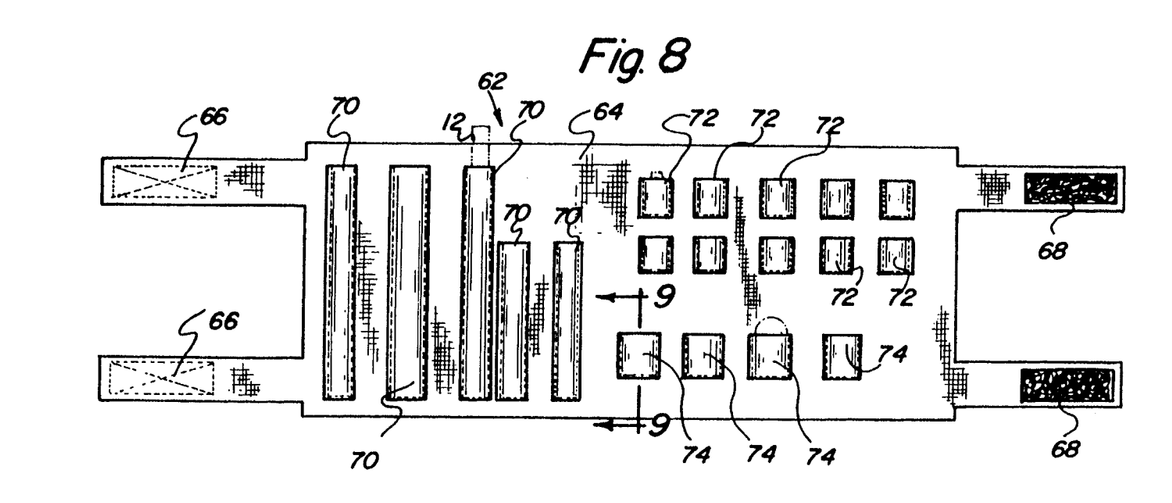
FIG. 8 is top view of a third embodiment of the invention which includes a retainer, in belt form, for a plurality of interchangeable drill bits and screwdriver blades of the invention.
Figure 9:
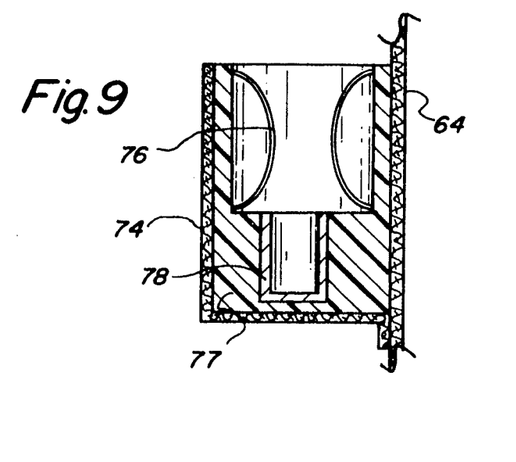
FIG. 9 is an enlarged cross-sectional view of a specific retainer element in FIG. 8 taken along the line 9—9 in FIG. 8.

Turning to FIGS. 8–9, a third embodiment of the invention is shown in which there is provided a flexible belt retainer assembly 62 for a plurality of interchangeable head assemblies 18. The flexible belt retainer assembly 62 includes a flexible belt member 64, complementary belt connecting straps 66 and 68 attached to the flexible belt member 64, and a plurality of receivers 70 for receiving the head-receiving members 12, a plurality of receivers 72 for receiving the interchangeable head assemblies 18 which include the cutting edges 32 and serve as interchangeable drill bits, and a plurality of receivers 74 for receiving the interchangeable head assemblies 18 which include the screwdriver blade portion 40 and serve as interchangeable screwdriver blades.

The connecting straps 66 and the connecting straps 68 includes complementary forms of well known hook and loop fastening material such as VELCRO ™. A receptacle for an interchangeable head assembly 18 includes a retention spring 76 or a magnet 78 for retaining the interchangeable head assembly 18 in the receptacle. The respective receivers for the respective interchangeable head assemblies 18 include molded inserts 77 that are shaped to conform to the respective contours of the respective interchangeable head assemblies 18 so that the interchangeable head assemblies 18 stand erect in the respective receivers.

The screwdriver blade heads can take a variety of blade forms. More specifically, the screwdriver blade head can be in the form of a single blade, a Phillips head, an Allen head, a hexagonal head, and a torx head, among others.

The components of the interchangeable head boring or driving apparatus of the invention can be made from inexpensive and durable metal materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved interchangeable head boring or driving apparatus that is low in cost, relatively simple in design and operation, and which may advantageously be used without necessitating replacement of a twist portion, a shank portion, and a tang portion when the head portion is replaced. With the invention, an interchangeable head boring or driving apparatus is provided which provides the benefits of interchangeable drill bit heads without employing a complex housing that contains a plurality of interchangeable drill bit heads that is difficult to manufacture and to dynamically balance. With the invention, an interchangeable head boring or driving apparatus is provided which provides a relatively large surface area of engagement between a replaceable drill bit head and its supporting structure so that torsional stresses between the replaceable drill bit head and its supporting structure is distributed over a relatively large surface area. With the invention, an interchangeable head boring or driving apparatus is provided which has some kind of instructive indicia which indicates to the user which type of materials the drill bit is designed to cut. With the invention, an interchangeable head boring or driving apparatus is provided which has some kind of instructive indicia which indicates to the user which type of material the drill bit is fabricated from. With the invention, an interchangeable head boring or driving apparatus is provided which has common tang and shaft portions and which has interchangeable heads that can be interchanged between cutting heads for a drill and blade-containing heads for a screwdriver. With the invention, an interchangeable head boring or driving apparatus is provided which has a screw driver blade device has some kind of instructive indicia which indicates to the user which type of material the screw driver blade is fabricated from. With the invention, an interchangeable head boring or driving apparatus is provided which can carry a set of drill bits or screwdriver blades in a belt device. With the invention, an interchangeable head boring or driving apparatus is provided which includes receiver portions for drill bits and screwdriver blades that includes means for retaining the respective items in their respective receiver portions. With the invention, an interchangeable head boring or driving apparatus is provided which provides a relatively large surface area of engagement between a replaceable screwdriver blade head and its supporting structure so that torsional stresses between the replaceable screwdriver blade head and its supporting structure is distributed over a relatively large surface area.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved interchangeable head boring or driving apparatus, comprising:
    a first head-receiving member which includes a first polygonal-shaped receiving well in alignment with a longitudinal axis of said head-receiving member,
    a plurality of respective interchangeable head assemblies which include respective head elements and respective projections which project from said head elements, said respective projections including a first polygonal shape complementary to said first polygonal-shaped receiving well, said respective projections projecting from said head elements, such that, when said respective projections are inserted into said first polygonal-shaped receiving well, said respective projections and said first polygonal-shaped receiving well are coaxial along said longitudinal axis, and
    locking assembly means for locking said respective projections into said first polygonal-shaped receiving well of said head-receiving member,
    wherein said head-receiving member includes a polygonal-shaped protuberance that fits into a complementary polygonal-shaped recess formed in respective portions of bottom sides of said respective interchangeable head assemblies.

2. The apparatus described in claim 1 wherein said first polygonal-shaped projection and said first polygonal-shaped receiving well have respective cross-sectional shapes of a polygon having from three to six sides.

3. The apparatus described in claim 1 wherein:
    said head-receiving member includes a shank portion and a twist portion, and
    said respective interchangeable head assemblies include respective head elements which include respective cutting edges.

4. The apparatus described in claim 1 wherein:
    a plurality of first interchangeable head assemblies include respective projections of a first polygonal shape,
    a first head-receiving member includes a first polygonal-shaped receiving well,
    a plurality of second interchangeable head assemblies include respective projections of a second polygonal shape,
    a second head-receiving member includes a second polygonal-shaped receiving well,
    said first interchangeable head assemblies are in a first polygonal class of interchangeable head assemblies, and
    said second interchangeable head assemblies are in a second polygonal class of interchangeable head assemblies.

5. The apparatus described in claim 4 wherein said first and second polygonal classes of interchangeable head assemblies relate to different sizes of said interchangeable head assemblies.

6. The apparatus described in claim 4 wherein said first and second polygonal classes of interchangeable head assemblies relate to different materials of fabrication of said interchangeable head assemblies.

7. The apparatus described in claim 4 wherein said first and second polygonal classes of interchangeable head assemblies relate to different classes of application of said interchangeable head assemblies.

8. The apparatus described in claim 1 wherein said interchangeable head assembly includes a screwdriver blade portion.

9. The apparatus described in claim 8 wherein said screwdriver blade portion is connected to a projection.

10. The apparatus described in claim 9 wherein said screwdriver blade portion is connected to said projection through an intermediate hemispherical member.

11. The apparatus described in claim 10 wherein said intermediate hemispherical member includes a receiving well for receiving one end of said screwdriver blade portion.

12. The apparatus described in claim 11, further including:
    a channel which receives a locking pin that is inserted in a channel in said intermediate hemispherical member.

13. The apparatus described in claim 1, further including:
    a flexible belt retainer assembly for retaining a plurality of interchangeable head assemblies.

14. The apparatus described in claim 13 wherein said flexible belt retainer assembly includes:
    a flexible belt member,
    complementary belt connecting straps and attached to said flexible belt member, and
    a plurality of receivers for receiving said head-receiving members, and
    a plurality of receivers for receiving said interchangeable head assemblies which include said cutting edges and serve as interchangeable drill bits, and
    a plurality of receivers for receiving said interchangeable head assemblies which include said screwdriver blade portion and serve as interchangeable screwdriver blades.

15. The apparatus described in claim 14 wherein a receptacle for an interchangeable head assembly includes a retention spring for retaining said interchangeable head assembly in said receptacle.

16. The apparatus described in claim 14 wherein a receptacle for an interchangeable head assembly includes a magnet for retaining said interchangeable head assembly in said receptacle.

* * * * *